(12) United States Patent
Golba

(10) Patent No.: US 8,575,264 B2
(45) Date of Patent: Nov. 5, 2013

(54) METHOD TO ESTABLISH VISCOSITY AS A FUNCTION OF SHEAR RATE FOR IN-SITU POLYMERIZED NANONYLON VIA CHAIN EXTENSION

(75) Inventor: Joseph C. Golba, Avon Lake, OH (US)

(73) Assignee: PolyOne Corporation, Avon Lake, OH (US)

( * ) Notice: Subject to any disclaimer, the term of this patent is extended or adjusted under 35 U.S.C. 154(b) by 99 days.

(21) Appl. No.: 13/190,735

(22) Filed: Jul. 26, 2011

(65) Prior Publication Data
US 2011/0281996 A1    Nov. 17, 2011

Related U.S. Application Data

(62) Division of application No. 12/527,359, filed as application No. PCT/US2008/053952 on Feb. 14, 2008, now Pat. No. 8,003,726.

(60) Provisional application No. 60/890,372, filed on Feb. 16, 2007.

(51) Int. Cl.
*C08K 3/34* (2006.01)

(52) U.S. Cl.
CPC ............................. *C08K 3/346* (2013.01)
USPC ..................... 524/789; 524/791; 523/216

(58) Field of Classification Search
USPC ............... 524/445, 789, 791; 523/216
See application file for complete search history.

(56) References Cited

U.S. PATENT DOCUMENTS

| | | | | |
|---|---|---|---|---|
| 5,385,776 | A * | 1/1995 | Maxfield et al. | 428/297.4 |
| 6,376,591 | B1 * | 4/2002 | Lan et al. | 524/445 |
| 6,504,004 | B2 * | 1/2003 | Zahr | 528/310 |
| 6,656,993 | B2 * | 12/2003 | Akkapeddi et al. | 524/442 |
| 7,026,383 | B2 * | 4/2006 | Sawada et al. | 524/318 |
| 7,642,308 | B2 * | 1/2010 | Golba et al. | 524/413 |
| 2002/0119266 | A1 * | 8/2002 | Bagrodia et al. | 428/35.7 |

FOREIGN PATENT DOCUMENTS

| | | | |
|---|---|---|---|
| EP | 703279 A1 | * | 3/1996 |
| JP | 2006131832 A | * | 5/2006 |

OTHER PUBLICATIONS

Akkapeddi (Chain Extension of PA-6 and PA-6/66 copolymer via Reactive Extrusion with Triscaprolactamyl phosphite. ANTEC 2001 Plastics: The Lon Star, vol. 1: Processing. May 2001, 5 pages).*
Lootjens (The Action of Chain Extenders in Nylon-6, PET, and Model Compounds. Journal of Applied Polymer Science, 1998, 65(9), 1813-1819).*
Machine translated English equivalent of JP 2006-131832 (May 2006, 8 pages).*
Machine translated English equivalent of EP 703279 (Jul. 2013, 25 pages).*

* cited by examiner

*Primary Examiner* — Ling Choi
*Assistant Examiner* — Brieann R Fink
(74) *Attorney, Agent, or Firm* — John H. Hornickel

(57) ABSTRACT

Chain-extended nanonylon is made from the reaction of in-situ polymerized nanonylon and chain-extending agents. Knowing the viscosity/shear rate curve for a thermoplastic polymer to be replaced, such as nylon, the method of the present invention allows via adjustment of organoclay concentration and chain extension of the nylon polymer and other reaction factors to achieve a chain-extended, in-situ polymerized nanonylon to have a viscosity/shear rate curve that essentially matches the viscosity/shear rate curve for that neat nylon within a commercially operable shear rate.

9 Claims, 5 Drawing Sheets

METHOD TO ESTABLISH VISCOSITY AS A FUNCTION OF SHEAR RATE FOR IN-SITU POLYMERIZED NANONYLON VIA CHAIN EXTENSION

CLAIM OF PRIORITY

This application is a divisional application of U.S. patent application Ser. No. 12/527,359, filed on Aug. 14, 2009, now U.S. Pat. No. 8,003,726, and is a 35 U.S.C. 371 National Stage entry of PCT application Ser. No. PCT/2008/053952 filed on Feb. 14, 2008, claiming the benefit of U.S. Provisional Patent Application 60/890,372 and filed on Feb. 16, 2007, which is hereby incorporated by reference.

FIELD OF THE INVENTION

This invention concerns composites of polyamide and organoclay which are tailored to achieve a specific region of melt viscosity value as a function of melt shear rate at a given melt temperature for optimal performance of processing and performance.

BACKGROUND OF THE INVENTION

The mixture of organoclays and polyamides, commonly called "nanonylons", is highly desired because the organoclays can contribute barrier properties to polyamides for food packaging and other situations where the contained product within packaging must not leach, escape, or decay. Polyamides have been useful since the mid-$20^{th}$ Century. Organoclays, nanoclays intercalated with organic ions, such as quaternary ammonium, have become useful commercially in the last decade.

Presently, nanonylons can be made using two conventional processes: (1) melt mixing of the organoclay into the previously polymerized nylon, in which the clay is added to a nylon melt by mechanical action; and (2) in-situ polymerization of the nylon in the presence of the organoclay, in which a batch of monomer such as caprolactam is brought to polymerization in a vessel also containing organoclay.

An example of melt mixing is found in U.S. Pat. No. 6,605,655 (Kato et al.). An example of in-situ polymerization is found in U.S. Pat. No. 4,739,007 (Okada et al.).

SUMMARY OF THE INVENTION

Unfortunately, there are difficulties with both preparation methods for nanonylons.

Melt mixing of organoclay with pre-polymerized nylon fails to achieve the extent of dispersion required for establishing the full benefits of the organoclay throughout the bulk of the nylon, which fails to approach optimized barrier properties for nanonylon films, containers and other articles in which limitation of transport through the nanonylon is highly desired.

In-situ polymerization of nylon from monomer in the presence of organoclay ("polymerized nanonylon") currently has a practical limit of about 8% concentration by weight of the organoclay in the nanonylon, above that concentration the polymerized nylon containing the organoclay is often too viscous for convenient removal from the reaction chamber. Also the in-situ polymerization conditions for use with organoclay, particular at 3-8 wt. % concentration of organoclay are limited to those used to make so-called lower melt viscosity B70 nylon for injection molding, not higher melt viscosity B40 nylon for blown film co-extrusion.

Therefore, while an 8% nanonylon may be suitable for certain nanonylon compounds destined for injection molding and other lower viscosity article-making processing (i.e., B70-type nanonylon), it is not suitable for nanonylon compounds which need a viscosity (i.e., B40-type nylon) that exceeds the inherent upper limit of viscosity possible from the polymerized nanonylon reaction chamber. Typical article-making processing requiring higher viscosity nanonylon compounds includes blown film co-extrusion, two-component injection molding, blow molding, and other circumstances where the formation of the article involves the delicate balance of polymer rheology, the atmosphere into which the molten polymer is cooling, and, often, the presence of other polymeric layers or materials during such cooling.

It is an unresolved problem that the polymerization reaction of monomers, such as caprolactam, is halted before the molecular weight of the nylon becomes excessive, in terms of viscosity, because to continue would impede the removal of the reacted product, also called a "drop", of the in-situ polymerized nylon. Therefore, it is not presently possible to make a blown film a high viscosity grade nanonylon having organoclay content exceeding about 3 weight percent. Yet the market has demands for nanonylon operating as a replacement for high viscosity grade nylons, such as B40 grade nylon.

Thus, the problem in the art is that polymerized nanonylon presently has a practical concentration limit of about 8%, while there are many who desire a polymerized nanonylon having a viscosity that exceeds the maximum practical viscosity achievable from in-situ polymerization of nylon in the presence of the organoclay. This problem is especially acute for blown film co-extrusion which utilize "bubble formation" of several meters high, against the force of gravity, to possess sufficient viscosity to achieve proper film formation before slitting and rolling occurs.

In this application, unless otherwise identified, viscosity refers to "apparent viscosity" ($\eta_{app}$ measured in Pa·sec), not "complex viscosity" ($|\eta^*|$ also measured in Pa·sec). Both apparent viscosity and complex viscosity are types of melt viscosity, measured using different techniques.

The present invention solves this problem by using chain extension chemistry in a reactive extrusion process, starting from the viscosity-limited in-situ polymerized nanonylon.

More precisely, the present invention begins with an in-situ polymerized nanonylon, as defined herein, to make a higher viscosity, higher molecular weight nanonylon. Even more precisely, the nanocomposite of the present invention provides all of the benefits of nanonylon to a nylon grade (B40) that can not be made into nanonylon by an in-situ polymerization process that is truly needed for as much dispersion of organoclay as possible.

Others have considered chain extension of in-situ polymerized nanonylon but not explained how or why. In that regard, there is a long-felt need that has not been recognized by the inventors of, or satisfied by disclosures of, U.S. Pat. Nos. 6,486,253 (Gilmer et al.); 6,417,262 (Turner et al.); or 6,386,996 (Lan et al.) None of those three patent documents exemplify a chain extension reaction or why chain extension is particularly preferable compared with the list of other post-polymerization techniques. None of those three patent documents exemplify why chain extension to a higher molecular weight is advantageous. Many of the same inventors have authored U.S. Published Patent Application 20020193494 (Gilmer et al.) which exemplify chain extension, but from oligomeric nanonylon, not fully in-situ polymerized nanonylon.

It is well known that the purpose of combining organoclay with nylon is to introduce barrier properties and stiffness and heat resistance to the nylon resin. In-situ polymerized nanonylon does a much better job of dispersing the organoclay throughout the nylon because of polymer/organoclay intermixing at the nanometric level.

Despite this dispersion advantage to introduce barrier properties and stiffness and heat resistance via in-situ polymerization, the polymerized nanonylon has not yet achieved the same viscosity, the same molecular weight, or the same rheology as the neat nylon prepared in the same manner.

The problem of "discounted viscosity" in a range of commercially preferred shear rates is easy to recognize but unexpectedly difficult to solve. Because the goal of any functional additive is not to detract from the baseline physical properties of the polymer matrix into which that functional additive is introduced, the art of nanonylon chemistry has stalled at a practical maximum viscosity, molecular weight, and rheology.

In this application, unless otherwise identified, "shear rate" viscosity refers to "apparent shear rate" ($\gamma_{app}$ measured in $\sec^{-1}$), not "angular shear rate" or angular frequency ($\omega$ measured in radians/sec).

The present invention unexpectedly provides a method to establish the viscosity of the in-situ polymerized nanonylon as a function of the shear rate at a given melt temperature of processing, in such a manner that the re-engineered polymer compound can become what is known in the industry as a "drop-in" substitute.

The present invention solves the problem plaguing polymer nanocomposites of polyamide origin by establishing the viscosity as a function of shear rate at a given processing temperature that allows the in-situ polymerized nanonylon to be processed as a "drop-in" for any other polymer and also provides the performance properties ultimately desired by the introduction of the organoclay to the nylon, that the neat nylon or the other polymer does not possess.

Stated another way, knowing the viscosity/shear rate curve for a polymer, whether it be nylon, the nylon of the same grade as used in the nanonylon, or any other extrudable or moldable thermoplastic polymer or polymer blend, the method of the present invention allows via adjustment of organoclay concentration and chain extension of the nylon polymer in the in-situ polymerized nanonylon to achieve a chain-extended, in-situ polymerized nanonylon to have a viscosity/shear rate curve that essentially matches the viscosity/shear rate curve for that polymer targeted for replacement.

It is an advantage of the present invention that the act of chain extension does not alter the overall concentration of organoclay in the nanonylon.

The present invention involves a combination of ten different processing and ingredient factors (collectively called "reaction factors") in order to create a nanonylon that is a "drop-in" replacement for another thermoplastic. Those reaction factors are:

1. Type of organoclay(s) (both clay and its intercalant).
2. Weight percent of organoclay (s).
3. Type of chain extending agent(s).
4. Weight percent of chain extending agent(s).
5. Type of twin-screw extruder.
6. Type of screw design.
7. Sequence of addition of ingredients.
8. Screw speed.
9. Throughput rate.
10. Temperature(s) of extruder zones.

One skilled in the art, without undue experimentation, can establish these reaction factors for an amount and type of organoclay and an amount and type of chain extending agent using the rigor of predictable experimentation via the Scientific Method. Then, through normal experience and such experimentation tools as Design of Experiments, one skilled in the art then can build ranges of reaction factors 5-10 that are more associated with the equipment and processing techniques.

One aspect of the present invention is a method of establishing viscosity and shear rate properties for in-situ polymerized nanonylon, comprising the steps of (a) selecting a polymer to be replaced; (b) establishing the viscosity/shear rate curve for the polymer to be replaced; (c) selecting an in-situ polymerized nanonylon having a given concentration of organoclay desired for improvement of performance properties; (d) selecting a chain extending agent for the nanonylon; (e) establishing reaction factors of the chain extending agent for the nanonylon; (f) using the reaction factors, reacting the in-situ polymerized nanonylon with the chain extending agent present at a given concentration sufficient to produce a chain-extended, in-situ polymerized nanonylon that has a viscosity/shear rate curve that essentially matches a viscosity/shear rate curve for the polymer to be replaced.

"Essentially matches" is a relative term that is nonetheless fully descriptive and understandable to those of ordinary skill in the art of polymer engineering of polyamide thermoplastics without undue experimentation, because the practical, economic region of the viscosity/shear rate curve used in molding or extruding complex geometries of polyamide thermoplastics can vary among the factors of polyamide type, viscosity tolerable by the molding or extruding equipment, presence of other polymers or materials in multi-layer or other complex structures, and shear rate tolerable by the economics of energy consumption and speed of the molding cycle or extrusion operating rate.

Thus, "essentially matches" can be any point or a limited geometric segment along the viscosity/shear rate curve desired by the polymer engineer, so long as the viscosity/shear rate point along that curve of the chain-extended, in-situ polymerized nanonylon is within ten percent (10%) in value of the viscosity/shear rate point of the polymer that the chain-extended in-situ polymerized nanonylon is engineered to replace.

One of ordinary skill in the art of using viscosity/shear rate curves in polymer engineering of commercial-scale thermoplastic articles can appreciate that the point or limited geometric segment of "essential match" can be determined without undue experimentation, because the polymer to be replaced already has had established a viscosity/shear rate curve and it is already known within what range of the shear rate that it is economically and rheologically possible to make a commercially acceptable molded or extruded article. Therefore, the region of "essential match" should be first within the commercially acceptable range of shear rate along the x-axis and then a +/−10% variation from the values of viscosity, within the commercially acceptable range of shear rate, of the polymer to be replaced in the commercial-scale polymer processing operation. Preferably, the variation within an essential match is +/−5% within the more desirable range of shear rates and more preferably +/−2% within the more preferred range of shear rates.

One of ordinary skill in the art of using viscosity/shear rate curves will also appreciate that the curves vary as a function of melt temperature. That complexity of an x-y-z terrain plot of these three variables is beyond the current scope of this invention, but it can be stated that the "essential match" of viscosity/shear rate curve steps of the present invention can be replicated at various melt temperatures. Nonetheless, it should be recognized that alteration of the variable of melt temperature of polymer processing will detract from the commercial desire to provide a "drop-in" replacement of chain extended, in-situ polymerized nanonylon of a polymer to be replaced, without other variables being affected.

With conventional chain extension agents, the present invention takes in-situ polymerized nanonylon and, using the reaction factors listed above, extends the chains of nylon (intimately intermixed with organoclay on a nanometric scale), making a nylon with higher molecular weight, higher melt flow index, greater viscosity, etc. while retaining essentially the same amount of organoclay therewithin in a condition as dispersed as the organoclay has been in the in-situ polymerized nanonylon. For purposes of this invention, to distinguish the product of this invention from "in-situ polymerized nanonylon", the product of this invention will be called "chain-extended nanonylon". According, therefore, to the present invention, chain-extended nanonylon can be a "drop-in" replacement for any polymer, whose viscosity/shear rate curve is known or easily determined.

Another aspect of this invention is a process for converting in-situ polymerized nanonylon into chain-extended nanonylon. That process uses a continuous reaction vessel such as an extruder in which the dwell time of the in-situ polymerized nanonylon is sufficient to complete chain extension to a desired level, thus forming a chain-extended nanonylon which can be used to essentially match its viscosity/shear rate curve with a viscosity/shear rate curve of a nylon it is engineered to replace for situations where one can "drop-in" the chain-extended nanonylon for the nylon without extensive alteration of molding or extruding conditions when making the final product.

Another aspect of the present invention is the chain-extended nanonylon formed by the process of the present invention.

Another aspect of the present invention is the use of chain-extended nanonylon in the manufacture of a thermoplastic compound, suitable for extruding or molding into a variety of article forms, such as films, fibers, vessels, etc. without extensive processing alterations from those processing conditions employed for the nylon it is engineered to replace.

Another aspect of the present invention is the article made from the chain-extended nanonylon with a minimum of processing alterations by essential matching of points on viscosity/shear rate curves for the chain-extended nanonylon and the nylon it is engineered to replace.

Features and advantages of the invention will be explained below while discussing the embodiments.

EMBODIMENTS OF THE INVENTION

In-Situ Polymerized Nanonylon

Figure 1:
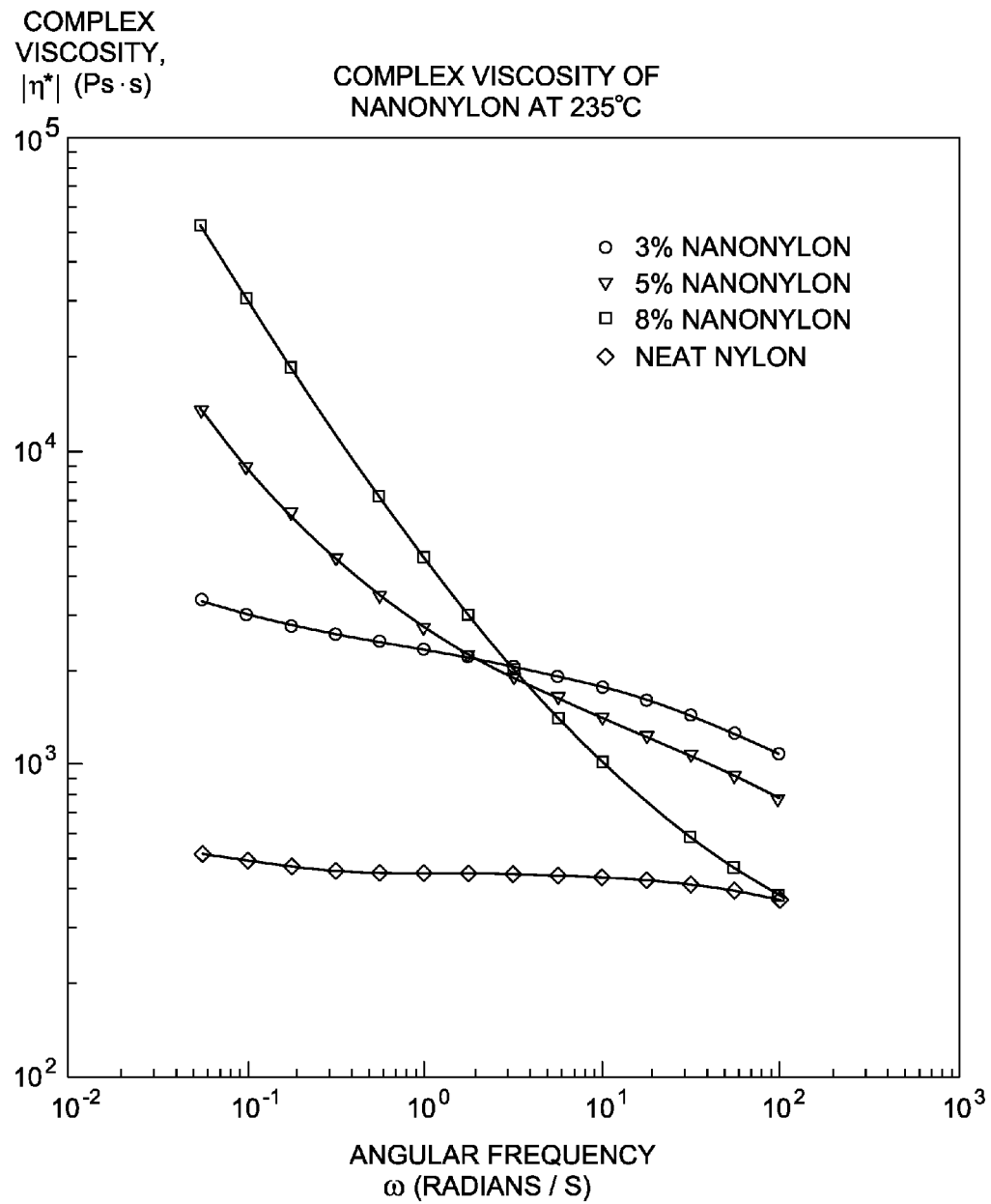
FIG. 1 is plot of complex viscosity relative to angular frequency of nanonylon in various concentrations of organoclay.

The chain-extended nanonylon is dependent on the content and properties of the in-situ polymerized nanonylon. Briefly stated, it is known that an in-situ polymerized nanonylon can be prepared using the techniques of U.S. Pat. Nos. 4,739,007; 4,810,734; 4,894,411; and 5,164,460 (all incorporated by reference as if re-written herein) containing as little as a minimally perceptible amount to as much as 8 weight percent of organoclay. In-situ polymerized nanonylon is commercially available from PolyOne Corporation of Avon Lake, Ohio, USA.

To achieve any weight percent in-situ polymerized nanonylon, an in-situ polymerization of polyamide-forming monomers, such as, preferably, caprolactam (cyclic compounds which undergo ring-opening polymerization to form polyamides), can be used to intercalate the organoclay with polyamide being polymerized from caprolactam and driving toward exfoliation, all according to the teachings of U.S. Pat. Nos. 4,739,007; 4,810,734; 4,894,411; and 5,164,460.

The in-situ polymerized nanonylon used in the present invention can have a weight average molecular weight of nylon, ranging from about 50,000 to about 80,000, and preferably about 75,000.

It is has been found, unexpectedly, that an equilibrium of reaction is reached in a direct comparison of in-situ polymerized nylon and in-situ polymerized nanonylon of the same nylon chemistry, resulting in a discounted viscosity for the nanonylon. It is that discounted viscosity for the in-situ polymerized nanonylon that the present invention employs chain-extension techniques to remove the discounted gap in viscosities, particularly in a geometric segment of shear rates along the viscosity/shear rate curve where a "drop-in" of chain-extended nanonylon is economically efficient and practically possible for the polymer engineer to gain all of the barrier, stiffness, and heat resistance performance properties of nanonylon as compared with the polymer to be replaced—all without alteration of "tried and true" processing conditions.

Organoclays

Organoclays arrive at the cusp of the present invention already as a part of the in-situ polymerized nanonylon. However, the ability to determine which organoclay to use, and hence which in-situ polymerized nanonylon to use, will be possible to a person practicing this invention.

Organoclay is obtained from nanoclay. Nanoclay is an inorganic clay from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Nanoclay becomes commercially significant if intercalated with an organic intercalant to become an organoclay. An intercalate is a clay-chemical complex wherein the clay gallery spacing has increased, due to the process of surface modification by an intercalant. Under the proper conditions of melt temperature and shear, an intercalate is capable of exfoliating in a resin matrix, such as a polyamide. An intercalant is an organic or semi-organic chemical capable of entering the montmorillonite clay gallery and bonding to the surface. Exfoliation describes a dispersion of an organoclay (surface treated nanoclay) in a plastic matrix at the nanometric level. In this invention, in-situ polymerized nanonylon has exfoliated organoclay at least to some extent and preferably in excess of that achievable using the conventional melt mixing process for making polymerized nanonylons.

In exfoliated form, nanoclay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites generally are the combination of the organoclay and the plastic matrix. In this invention, in-situ polymerized nanonylon is one type of nanocomposite. In polymer compounding, a nanocomposite is a very convenient means of delivery of the organoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites. Particularly preferred intercalated organoclays are I.24TL, I.30P, and I.44P from Nanocor.

Nanocomposites offer flame-retardancy properties because such nanocomposite formulations burn at a noticeably reduced burning rate and a hard char forms on the surface. They also exhibit minimum dripping and fire sparkling.

Moreover, nanocomposites made from nylon as the thermoplastic matrix also have barrier properties useful in films, fibers, and other forms. Barrier properties can be measured as transmission rates, namely for oxygen transmission rates in the units of cc-mil/100 in$^2$-day and for water vapor transmission rates, g-mil/m$^2$-day, respectively.

Nylons

The polyamides useful for making the in-situ polymerized nanonylon can be one or a number of polyamides, (nylons) comprise crystalline or resinous, high molecular weight solid polymers including copolymers and terpolymers having recurring amide units within the polymer chain. Polyamides may be prepared in the presence of organoclays by polymerization as far as in-situ polymerization will permit, of one or more epsilon lactams such as caprolactam, pyrrolidone, lauryllactam and aminoundecanoic lactam, or amino acid, or by condensation of dibasic acids and diamines.

Non-limiting examples of polyamide homopolymers and copolymers are polycaprolactam (nylon 6), poly(hexamethylene adipamide) (nylon 6,6), poly(hexamethylene sebacamide) (nylon 6, 10), poly(11-aminondecanoic acid) (nylon 11), poly(12-aminododecanoic acid) (nylon 12) and the like.

Chain Extending Agents

Any commercial chain extending agent that can increase the molecular weight of the nylon oligomers in the in-situ polymerized nanonylon is suitable for use in the present invention.

Non-limiting examples of such chain extending agents are carbodiimides, carbodiimide hydrochlorides, multi-functional epoxies, carbonylbiscaprolactames, and multi-functional acrylic oligomers (such as Cesa-extend brand oligomers from Clariant Additive Masterbatches of Winchester, Va., USA).

Of the above itemized chain extending agents, the following three chain extending agents are preferred: Joncryl ADR-4365 chain extender from BASF (formerly Johnson Polymers) of Racine, Wis., USA; Raschig Stabilizer 9000 polymeric carbodiimide and Raschig Stabilizer 11000 polymeric carbodiimide stabilizers, both from Raschig GmbH of Ludwigshafen, Germany.

Optional Additives

The chain-extended nanonylon of the present invention can include conventional plastics additives in an amount that is sufficient to obtain a desired processing or performance property for the ultimate thermoplastic compound, but in a manner that does not disrupt the reaction chain extending agents with the in-situ polymerized nanonylon to form the chain-extended nanonylon.

The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the chain-extended nanonylons of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Optional Polymers

While the chain-extended nanonylon can be made without other polymers present, it is optional to introduce other polymers into the extruder for a variety of ultimate compound properties and performances, but in a manner that does not disrupt the reaction chain extending agents with the in-situ polymerized nanonylon to form the chain-extended nanonylon.

The same polyamide as constitutes the nanonylon can be added if it is desired to dilute the organoclay concentration in the nylon to a specific lower level. Likewise, a blend of thermoplastics can be created at this time of chain extension reaction by using other polyamides or other resins such as those selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof. Also, any polymer that is reactive with the chain extending agent(s) can be added into the extruder to form copolymers with the polyamide during reactive extrusion, in order to form a chain-extended copolymeric nanonylon.

Optional Endcapping Agents

Because chain extension begins with reaction at functional groups at the ends of the nylon oligomer, after reaction with the chain extending agents, it is optional to introduce endcapping agents to the extruder to forestall any addition reaction of the ends of the chain-extended nanonylon beyond the desired molecular weight, desired melt flow index, or desired viscosity.

Non-limiting examples of endcapping agents are acetic anhydride, phthalic anhydride, hexamethyl disilazane, acetic acid, and cyclohexylamine.

Table 2 shows ranges of acceptable, desirable, and preferred weight percents of the various ingredients for addition to the extruder, relative to the total weight of the chain-extended nanonylon emerging from the extruder, all being expressed as approximate values. Because additives, other polymers, and endcapping agents are optional, the low end of each range is zero.

TABLE 1

Weight Percent of Ingredients For Chain Extension Reactive Extrusion

| Ingredients | Acceptable (Wt. %) | Desirable (Wt. %) | Preferred (Wt. %) |
|---|---|---|---|
| In-situ polymerized nanonylon | 10-99.5 | 30-950 | 50-90 |
| Chain Extending Agent | 0.5-20 | 0.7-10 | 1-5 |
| Optional Additives | 0-70 | 0-50 | 0-30 |
| Optional Polymers | 0-90 | 0-65 | 0-50 |
| Optional Endcapping Agents | 0-15 | 0-10 | 0-5 |

Chain Extension and Extruder Reaction Factors

The preparation of compounds of the present invention is uncomplicated. The compound of the present invention can be made in batch or continuous operations.

Reaction via chain extension in a continuous process for this invention occurs in an extruder that is elevated to a temperature that is sufficient to melt the in-situ polymerized nanonylon and to adequate disperse the chain extending agent and optional additive and optional polymers therewithin.

Extruders have a variety of screw configurations, including but not limited to single and double, and within double, co-rotating and counter-rotating. Extruders also include kneaders and continuous mixers, both of which use screw configurations suitable for mixing by those skilled in the art without undue experimentation. In the present invention, it is preferred for chain extension to use a co-rotating twin screw extruder commercially available from such worldwide suppliers as Coperion Werner-Pfleiderer, Mannesmann Berstorff, Leistritz, etc.

Extruders can have a variety of screw design elements. Of all factors, choice of screw design elements is variable from one experienced polymer engineer to another experienced polymer engineer. For this invention, the following types of screw design elements can be used: conveying, anti-conveying, forward kneading, neutral kneading, reverse kneading, and other special designs. Without undue experimentation, one skilled in the art of polymer engineering can mix and match various combinations of screw design elements in order to achieve the techniques of feeding, distributive mixing, dispersive mixing, venting, pumping, etc.

Extruders have a variety of heating zones and other processing parameters that interact with the elements of the screw(s). Extruders can have temperatures and other conditions according to acceptable, desirable, and preferable ranges as shown in Table 2.

TABLE 2

Processing Conditions

| Condition | Acceptable | Desirable | Preferred |
|---|---|---|---|
| Zones 1-5 Temp. | 210° C.-250° C. | 220° C.-240° C. | 230° C. |
| Zones 6-7 Temp. | 220° C.-260° C. | 230° C.-250° C. | 240° C. |
| Zones 8-9 Temp. | 230° C.-270° C. | 240° C.-260° C. | 250° C. |
| Die Temp. | 240° C.-280° C. | 250° C.-270° C. | 260° C. |
| Screw Rotation | 300-700 rpm | 350-600 rpm | 400 rpm |
| Throughput Rate | 4-36 kg./hr | 9-27 kg./hr | 18 kg./hr |

Location of ingredient addition into the extruder can be varied according the desired duration of dwell time in the extruder for the particular ingredient. Table 3 shows acceptable, desirable, and preferable zones when ingredients are to be added in the process of the present invention.

TABLE 3

Ingredient Addition Points

| Ingredient | Acceptable Zone(s) |
|---|---|
| In-situ polymerized nanonylon | Throat |
| Chain Extending Agent | Throat or Downstream or Both |
| Optional Additives | Throat or Downstream or Both |
| Optional Polymers | Throat or Downstream or Both |
| Optional Endcapping Agents | Downstream |

Typically, the output from the extruder is pelletized for later extrusion or molding into polymeric articles.

The chain-extended nanonylon of the present invention should have a weight average molecular weight of nylon, ranging from about 85,000 to about 110,000, and preferably from about 95,000 to about 100,000. Thus, the weight average molecular weight of the chain-extended nanonylon can be as much as 200% more than the starting weight average molecular weight of the in-situ polymerized nanonylon. This increase removes the discount of viscosity that in-situ polymerization inherently creates and allows essential matching of viscosity/shear rate points on those curves, as described above.

Subsequent Processing

The chain-extended nanonylon made according to the present invention can serve either as a concentrate or as a compound. If the former, then the chain-extended nanonylon is an intermediate product, an ingredient to be added with other ingredients to subsequent compounding steps in a batch or continuous mixing apparatus.

Ultimately, the compound is formed into an article using a subsequent extrusion or molding techniques. These techniques are well known to those skilled in the art of thermoplastics polymer engineering. Without undue experimentation but using references such as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using chain-extended nanonylons of the present invention.

The article-forming process that benefits the most from the method of the present invention is multi-layer blown film co-extrusion because the necessity of "essential matching" of viscosities as a function of shear rate at a given melt temperature is critical for the various layers being formed from different polymer compounds of the same or different polymers. For example, a typical multi-layer blown film construction of a polyethylene or polyethylene blend, tie layer, and other polymer can benefit from the use of chain-extended nanonylon of the present invention as a replacement for that other polymer, be it neat nylon or an ethylene vinyl alcohol copolymer.

Table 4 shows the essential match range along a viscosity/shear rate curve for a B40 grade nylon polymer to be replaced by a chain-extended nanonylon of the present invention in a multi-layer blown film, according to acceptable, desirable, and preferred levels of essential matching.

TABLE 4

Apparent Shear Rate For B40 Blown-Film Grade Nylon Essential Matching (100-250 sec$^{-1}$)

|  | Acceptable Processing Viscosity (900-1600 Pa · sec) | Desirable Processing Viscosity (1000-1450 Pa · sec) | Preferred Processing Viscosity (1100-1300 Pa · sec) |
|---|---|---|---|
| Acceptable Essential Matching +/−10% | 810-1760 | 900-1595 | 990-1430 |
| Desirable Essential Matching +/−5% | 855-1680 | 950-1523 | 1040-1365 |
| Preferred Essential Matching +/−2% | 882-1632 | 980-1480 | 1078-1326 |

Viscosity/shear rates of commercially acceptable in-situ polymerized nanonylon from PolyOne Corporation are shown in FIG. 1, a logarithmic graph of Complex Viscosity and Angular Frequency. It can be seen as one progresses from Neat Nylon to increasing levels of organoclay up to the current practical limit of 8%, the viscosity/shear rate curves become increasingly non-Newtonian in nature. This reality causes a step in the method of the present invention to be a selection of concentration of organoclay, which will not change during chain extension, but will provide the desired performance property improvements as a "drop-in" replacement for the polymer to be replaced.

Figure 2:
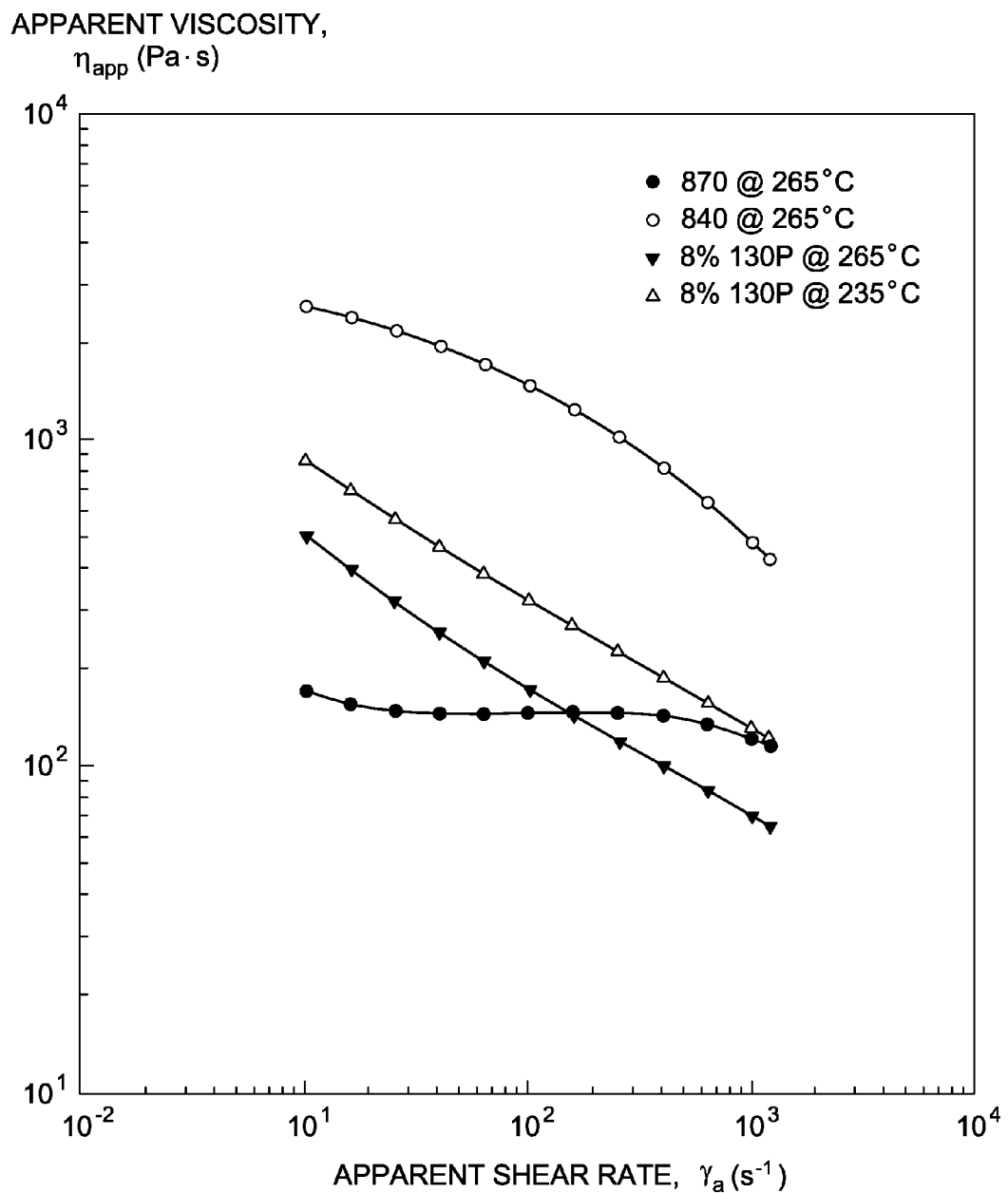
FIG. 2 is a plot of apparent viscosity relative to apparent shear rate for B70 and B40 nylon and B70 nanonylon of one organoclay type at two different melt temperatures (24.5 L/D; R=0.051832 cm)

FIG. 2 shows a logarithmic graph of Apparent Viscosity and Apparent Shear Rate for two commercially available blown film grade neat nylons, B40 and B70, and 8% loaded in-situ polymerized nanonylon at two different processing temperatures. This graph shows two realities: (a) the presence of organoclay in the nylon made according to B70 grade polymerization conditions has an inherent discounted viscosity compared with neat B70 nylon in the range of commercially acceptable shear rates (100-250 sec$^{-1}$); and (b) B70 neat nylon and B70 nanonylon at both temperatures exhibit much lower viscosities than B40 nylon proposed to be replaced. This graph also shows that processing the in-situ polymerized nanonylon at a temperature 30° C. lower raises viscosity along the entire range of commercially operable shear rates, but removes the "drop-in" capability, because melt temperature is a critical variable in blown film co-extrusion. Therefore, according to the present invention, one needs to chain-extend the nanonylon polymer chains in the in-situ polymerized nanonylon to increase the apparent viscosity in the commercially operable shear rate range of 100-250 sec$^{-1}$.

Figure 3:
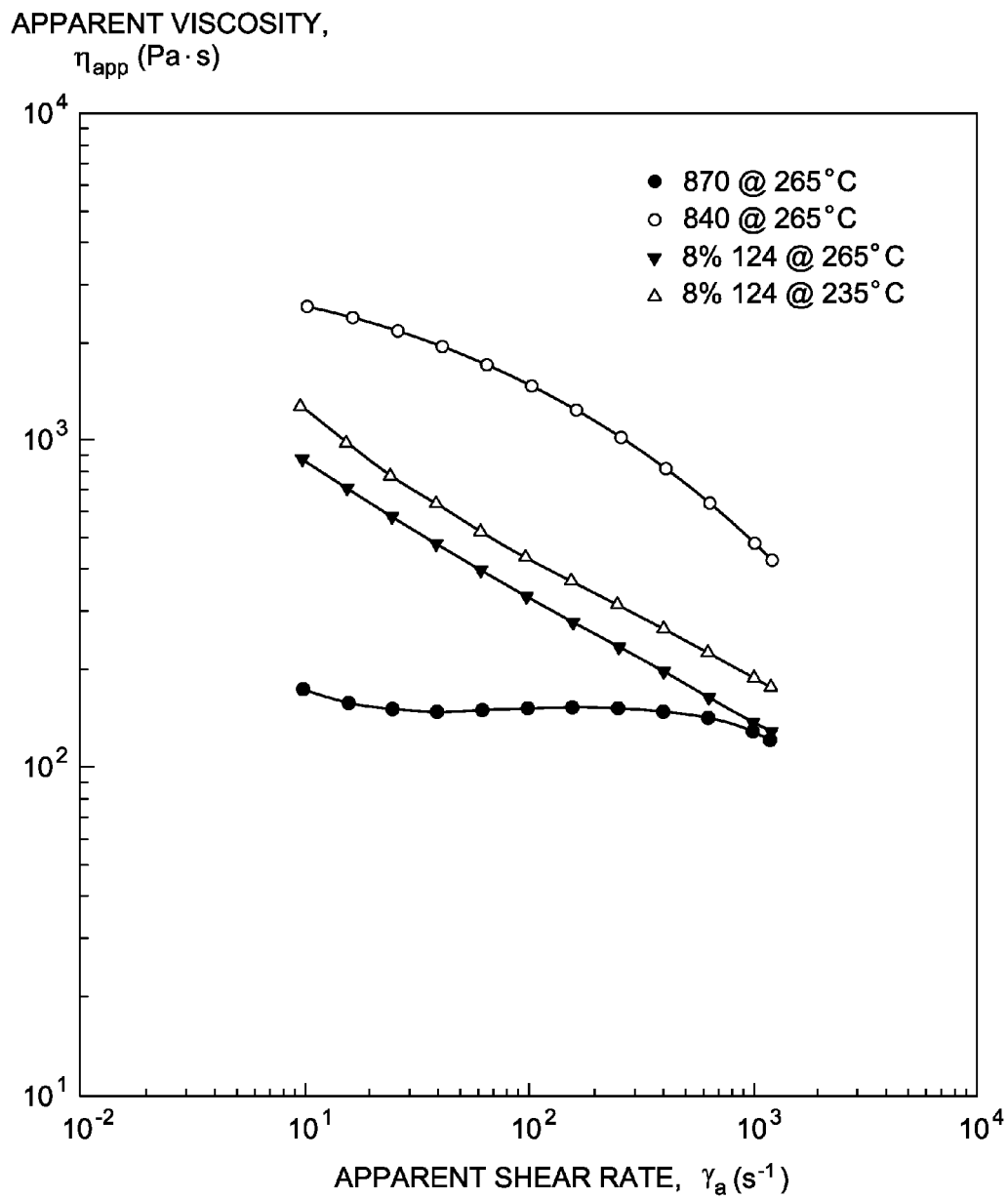
FIG. 3 is a plot of apparent viscosity relative to apparent shear rate for B70 and B40 nylon and B70 nanonylon of another organoclay type at two different melt temperatures (24.5 L/D; R=0.051832 cm)

FIG. 3 shows a logarithmic graph of Apparent Viscosity and Apparent Shear Rate for two commercially available blown film grade neat nylons, B40 and B70, and 8% loaded in-situ polymerized nanonylon at two different processing temperatures, except that type of organoclay has changed relative to FIG. 2. Therefore, selection of the type of organoclay to be used in the in-situ polymerized nanonylon also contributes different viscosity/shear rate curves. Whereas the use of I30P organoclay from Nanocor, Inc. resulted in in-situ polymerized nanonylon between B40 and B70 neat nylon in the graph of FIG. 2, the use of I24TL organoclay (apparently a difference in intercalant used) in FIG. 3, places reduces the gap in their viscosities relative to B40 neat nylon to be replaced, both at 235° C. and 265° C. The difference between FIG. 2 and FIG. 3 shows that I24TL is better candidate than I30P for use in nanonylon chain extension.

Figure 4:
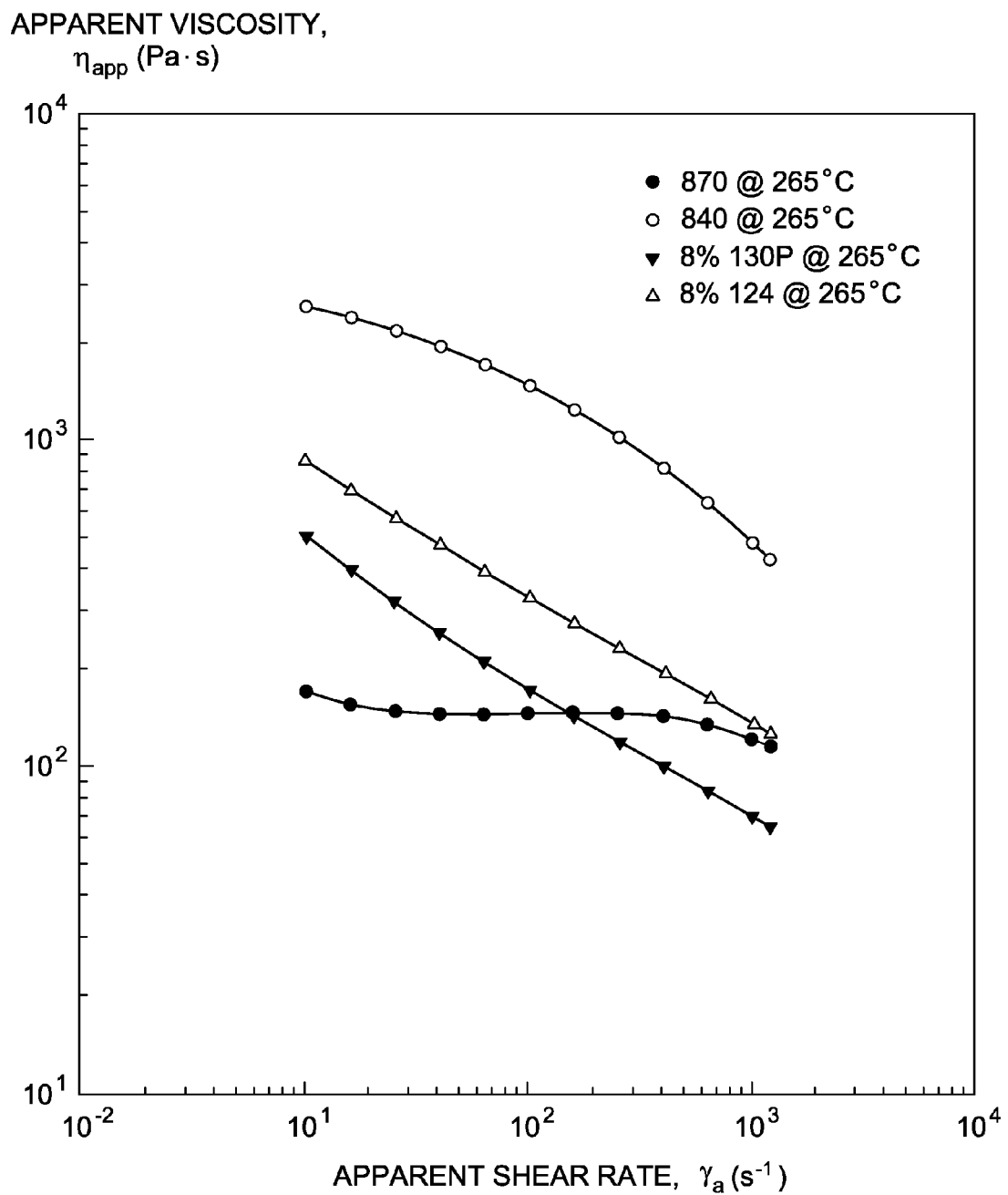
FIG. 4 is a plot of apparent viscosity relative to apparent shear rate for B70 and B40 nylon and two different B70 nanonylons, all at the same melt temperature, demonstrating the deficiencies of B70 nanonylons to be "drop-in" replacements for B40 nylon (24.5 L/D; R=0.051832 cm)

FIG. 4 shows a logarithmic graph of Apparent Viscosity and Apparent Shear Rate, all at the same melt temperature, which confirms a preference for I24TL organoclay over I30P organoclay. Unfortunately, the discounted viscosity of both nanonylons remains compared with B40 neat nylon to be replaced.

Figure 5:
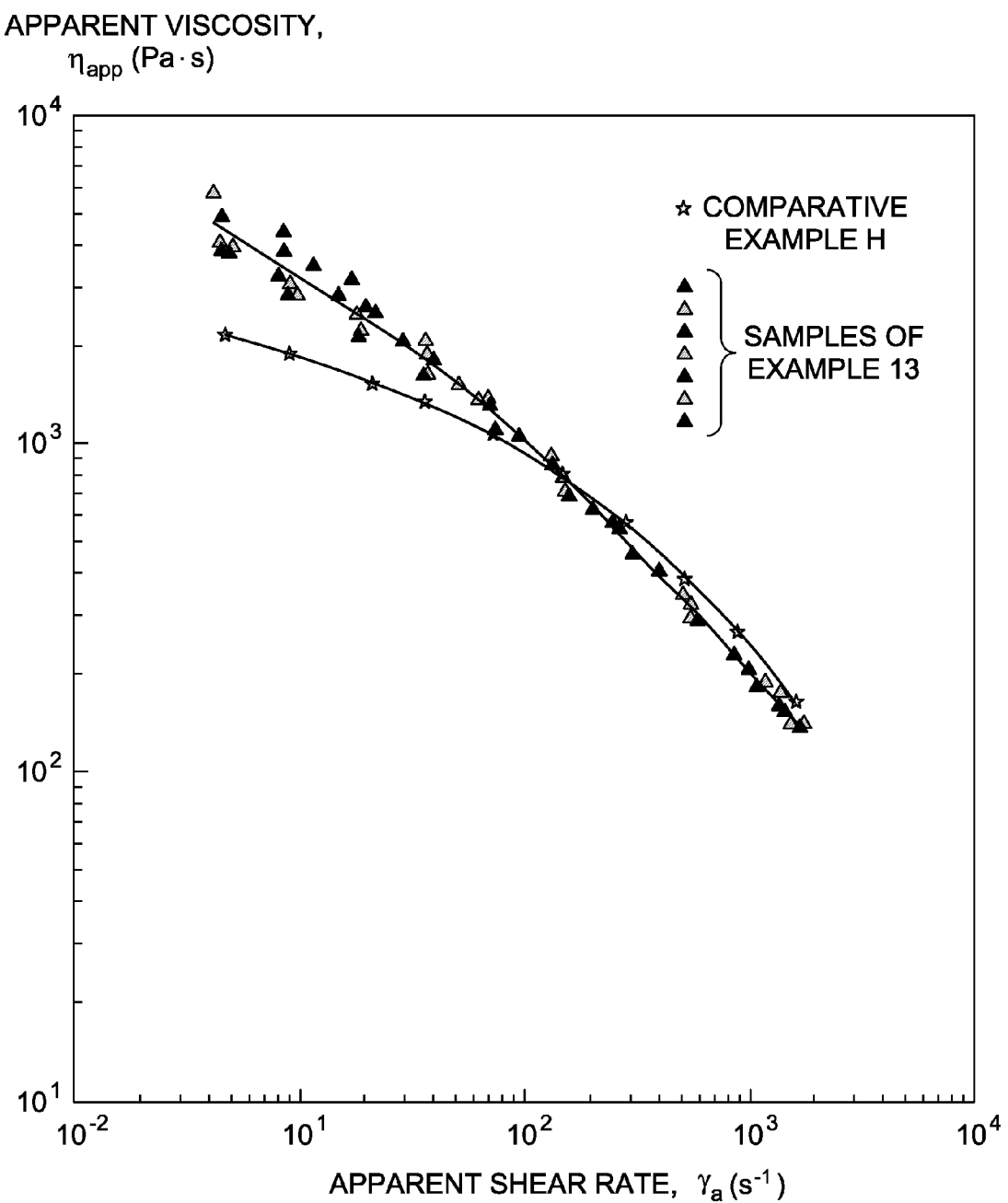
FIG. 5 is a plot of apparent viscosity relative to apparent shear rate showing chain-extended B70 nanonylon of Example 13 below as a "drop-in replacement" for B40 nylon, because of "essential match" at a range of commercially acceptable shear rates (24.5 L/D; R=0.051832 cm; 265° C.).

FIG. 5 shows the results after application of all of the reaction factors and the completion of chain extension. The apparent viscosity/shear rate curves were measured at intervals of production during experimentation to gain insight into variability during processing. Therefore, a number of curves are shown relative to the B40 neat nylon to be replaced. Within the commercially operable shear rate range of 100-250 sec$^{-1}$, all of the samples from various times during production provided essential matches for the B40 neat nylon to be replaced. Table 4 above is another way of numerically expressing that result, using a composite curve of all of these samples. Using the method of this invention, this chain-extended nanonylon, made according to B70 polymerization conditions and then chain extended according to the reaction factors, is a drop-in replacement for a B40 neat nylon used as a layer in a multi-layered, co-extruded blown film.

It should be noted that FIG. 1 shows "complex viscosity", while FIGS. 2-5 show "apparent viscosity". As a reminder to those skilled in the art, often the apparent shear rate-dependent apparent shear viscosity is equivalent to the frequency-dependent complex viscosity when apparent shear rate is equated to angular frequency. This relationship, known as the Cox-Merz rule, is generally observed for simple, single component polymers that do not possess "structure". For multi-component polymer systems and polymers that contain strain-dependent "structure" (such as interactive or reinforcing fillers), the small-strain complex viscosity is typically larger in magnitude than is the large-strain apparent viscosity. The converse is true when a polymer displays large entry losses in capillary rheometry, for example when short L/D dies are used to perform the measurements.

Usefulness of the Invention

Chain-extended nanonylons of the present invention are useful for making packaging film; closures; containers of all shapes; impact modified articles; transportation-related molded items (e.g., crash helmets and parts for vehicles such as bumpers and fenders); electrical equipment when flame retardants or reinforcing fillers are also added (e.g., plugs, connectors, boxes, and switches); and consumer appliance housings and containers (e.g., kitchen appliance housings and shells, and consumer electronics housings and cases).

Further embodiments of the invention are described in the following Examples.

EXAMPLES

Examples 1-13 and Comparative Examples A-H were prepared for viscosity testing according to Table 5 below, taking into account the 10 reaction factors listed above.

Comparative Examples C, D, F, G, and H were tested "as received." Comparative Examples A and B underwent the same extrusion as experienced by Examples 1-12, but without chain extension, in order to compare the effects of additional heat history on a polyethylene blend and an in-situ polymerized nanonylon.

All of Examples 1-13 used 8% Nanoblend™ nanonylon, but with different organoclay types (PolyOne Corporation, Avon Lake, Ohio, USA), modified with Joncryl ADR-4365 chain extender from BASF (formerly Johnson Polymers) of Racine, Wis., USA, Raschig 9000, or Raschig 11000 stabilizers (both from Raschig GmbH of Ludwigshafen, Germany), in order to investigate the effect the various chain-extending agents, and the amounts of chain-extending agents, have on viscosity of the in-situ polymerized 8% nanonylon of different organoclay types via chain extension.

The extruder for Comparative Examples A and B and Examples 1-12 using a 16 mm Prism twin screw extruder (TSE) equipped with intensive mixing screws. The extruder for Example 13 was a Coperion Werner Pfleiderer 30 mm TSE equipped with screw elements for moderately intensive mixing, starting with a solids conveying section, followed by a melting/mixing section using kneading elements, followed by a second conveying section, followed by a second melt mixing section, followed by a conveying section though a vent zone, and then through the die. It should be noted that the 30 mm TSE has only 6 temperature zones before the die.

From the survey of Examples 1-12 compared with Comparative Examples A-D, I24TL organoclay at 8 wt. % in combination with Raschig 9000 stabilizer at 1.5 wt. % emerged as the best candidate for additional testing for essential matching, according to the results of Table 6 to be discussed below. Therefore, Example 13 was run on the larger and different TSE as an experiment of scale and different extruding equipment.

TABLE 5

Reaction Factors

| Example | Resin Type* | Organoclay Type | Organoclay Amount (Wt. %) | TSE Type | Chain Extender | Chain Extender Amount (Wt. %) | Chain Extender Addition Point | Zone 1 Temp. (° C.) | Zone 2 Temp. (° C.) |
|---|---|---|---|---|---|---|---|---|---|
| A | LDPE/LLDPE (40/60) | | | Prism 16 | | | | 200 | 200 |
| B | B70 NanoNylon | I30P | 8% | Prism 16 | | | | 220 | 230 |
| 1 | B70 NanoNylon | I30P | 8% | Prism 16 | Raschig 9000 | 0.5% | Throat | 220 | 230 |
| 2 | B70 NanoNylon | I30P | 8% | Prism 16 | Raschig 9000 | 1.5% | Throat | 220 | 230 |
| 3 | B70 NanoNylon | I30P | 8% | Prism 16 | Raschig 9000 | 2.5% | Throat | 220 | 230 |
| 4 | B70 NanoNylon | I30P | 8% | Prism 16 | Raschig 11000 | 0.5% | Throat | 220 | 230 |
| 5 | B70 NanoNylon | I30P | 8% | Prism 16 | Raschig 11000 | 1.5% | Throat | 220 | 230 |
| 6 | B70 NanoNylon | I30P | 8% | Prism 16 | Raschig 11000 | 2.5% | Throat | 220 | 230 |
| 7 | B70 NanoNylon | I30P | 8% | Prism 16 | Joncryl 4368 | 0.5% | Throat | 220 | 230 |
| 8 | B70 NanoNylon | I30P | 8% | Prism 16 | Joncryl 4368 | 1.5% | Throat | 220 | 230 |
| 9 | B70 NanoNylon | I30P | 8% | Prism 16 | Joncryl 4368 | 2.5% | Throat | 220 | 230 |
| C | B70 NanoNylon | I30P | 8% | | | | | | |
| D | B70 NanoNylon | I24TL | 8% | | | | | | |
| E | B70 NanoNylon | I24TL | 8% | Prism 16 | | | | 220 | 220 |
| 10 | B70 NanoNylon | I24TL | 8% | Prism 16 | Raschig 9000 | 0.5% | Throat | 220 | 220 |
| 11 | B70 NanoNylon | I24TL | 8% | Prism 16 | Raschig 9000 | 1.5% | Throat | 220 | 220 |
| 12 | B70 NanoNylon | I24TL | 8% | Prism 16 | Raschig 9000 | 2.5% | Throat | 220 | 220 |
| F | B40 Nylon | | | | | | | | |
| G | Anhydride-Modified LLDPE | | | | | | | | |
| H | B40 Nylon | | | | | | | | |
| 13 | B70 NanoNylon | I24TL | 8% | WP 30 | Raschig 9000 | 1.5% | Throat | 241 | 243 |

| Example | Resin Type* | Zone 3 Temp. (° C.) | Zone 4 Temp. (° C.) | Zone 5 Temp. (° C.) | Zone 6 Temp. (° C.) | Zone 7 Temp. (° C.) | Zone 8 Temp. (° C.) | Zone 9 Temp. (° C.) | Die Temp. (° C.) | Screw Rotation Speed | Throughput Rate** |
|---|---|---|---|---|---|---|---|---|---|---|---|
| A | LDPE/LLDPE | 200 | 210 | 210 | 220 | 220 | 220 | 225 | 225 | 500 | 14% |
| B | B70 Nylon | 240 | 240 | 245 | 245 | 250 | 250 | 250 | 255 | 500 | 18% |
| 1 | B70 Nylon | 240 | 240 | 245 | 245 | 250 | 250 | 250 | 255 | 500 | 20% |
| 2 | B70 Nylon | 240 | 240 | 245 | 245 | 250 | 250 | 250 | 255 | 500 | 20% |
| 3 | B70 Nylon | 240 | 240 | 245 | 245 | 250 | 250 | 250 | 255 | 500 | 23% |
| 4 | B70 Nylon | 240 | 240 | 245 | 250 | 250 | 250 | 250 | 255 | 500 | 18% |
| 5 | B70 Nylon | 240 | 240 | 245 | 250 | 250 | 250 | 250 | 255 | 500 | 18% |
| 6 | B70 Nylon | 240 | 240 | 245 | 250 | 250 | 250 | 250 | 255 | 500 | 20% |
| 7 | B70 Nylon | 240 | 240 | 245 | 250 | 250 | 250 | 250 | 255 | 500 | 20% |
| 8 | B70 Nylon | 240 | 240 | 245 | 250 | 250 | 250 | 250 | 255 | 500 | 22% |
| 9 | B70 Nylon | 240 | 240 | 245 | 250 | 250 | 250 | 250 | 255 | 500 | 25% |
| C | B70 Nylon | | | | | | | | | | |
| D | B70 Nylon | | | | | | | | | | |
| E | B70 Nylon | 240 | 240 | 245 | 245 | 250 | 250 | 250 | 255 | 500 | 10% |
| 10 | B70 Nylon | 240 | 240 | 245 | 245 | 250 | 250 | 250 | 255 | 500 | 12% |
| 11 | B70 Nylon | 240 | 240 | 245 | 245 | 250 | 250 | 250 | 255 | 500 | 10% |

TABLE 5-continued

| | | | | | Reaction Factors | | | | | | |
|---|---|---|---|---|---|---|---|---|---|---|---|
| 12 | B70 Nylon | 240 | 240 | 245 | 245 | 250 | 250 | 250 | 255 | 500 | 8% |
| F | B40 Nylon | | | | | | | | | | |
| G | Modified LLDPE | | | | | | | | | | |
| H | B40 Nylon | | | | | | | | | | |
| 13 | B70 Nylon | 243 | 246 | 252 | 257 | | | | 260 | 400 | 40 lbs./hr. |

*B70 refers to operating conditions of in-situ polymerization for B70 Nylon
**% Available Torque or lbs./hr.

Table 6 shows the viscosity test results, with all samples having been dried at 120° C. over-night and retained in sealed jars within the vacuum oven at room temperature until used for testing.

A Sieglaff-McKelvey controlled stress capillary rheometer, equipped with a die having a radius of 0.518 mm and an L/D of 24.5:1, was used to measure the apparent shear stress rate and apparent viscosity of the samples over an apparent shear rate of approximately 10 to $3 \times 10^3$ s$^{-1}$ at 235 and 265° C. The samples were provided a pre-heat time of 6 minutes prior to initiating testing. The total residence time of the sample during the pre-heat and execution of testing was typically 12 to 15 minutes.

TABLE 6

Apparent Viscosity Test Results

| Example | Apparent Viscosity at 100 s$^{-1}$ and 235° C. (Pa · sec) | Apparent Viscosity at 1000 s$^{-1}$ and 235° C. (Pa · sec) | Apparent Viscosity at 100 s$^{-1}$ and 265° C. (Pa · sec) | Apparent Viscosity at 1000 s$^{-1}$ and 265° C. (Pa · sec) |
|---|---|---|---|---|
| A | 1186 | 307 | 585 | 220 |
| B | 147 | 79 | 94 | 45 |
| 1 | 224 | 105 | 119 | 57 |
| 2 | 354 | 147 | 168 | 83 |
| 3 | 404 | 174 | 230 | 101 |
| 4 | 234 | 107 | 119 | 57 |
| 5 | 294 | 133 | 173 | 79 |
| 6 | 376 | 164 | 207 | 90 |
| 7 | 244 | 106 | 143 | 63 |
| 8 | 374 | 134 | 221 | 86 |
| 9 | 542 | 174 | 341 | 113 |
| C | 236 | 95 | 150 | 59 |
| D | 669 | 242 | 325 | 129 |
| E | 554 | 215 | 254 | 117 |
| 10 | 807 | 288 | 405 | 171 |
| 11 | 1439 | 449 | 806 | 288 |
| 12 | 1696 | 543 | 1091 | 333 |
| F | 1833 | 543 | 1029 | 411 |
| G | 1275 | 372 | 1030 | 326 |
| H | | | 1450 | 478 |
| 13 | | | 1550 | 411 |

Of Examples 1-12, at 265° C. and 100 sec$^{-1}$, Examples 11-12 (I24TL organoclay at 8 wt. % in combination with Raschig 9000 stabilizer at 1.5 wt. % and 2.5 wt. %, respectively) flanked Comparative Example F (B40 neat nylon), the polymer to be replaced and also flanked Comparative Example G (Anhydride-Modified LLDPE) likely to be the composition of another layer in a blown-film laminate. The achievement of essential matching had a candidate to attempt at a larger production-scale extruder.

The preparation of Examples 1-12 and analysis of their respective viscosities compared with a polymer to be replaced completed the step in the method of the present invention of establishing the reaction factors to enable a chain extension of in-situ polymerized nanonylon to provide an essential match for the polymer to be replaced.

Between Examples 11 and 12, the composition of Example 11 was used because only 60% of the chain-extending agent needed to be used. Thus, Example 13 of the same composition as Example 11 but prepared on a different extruder was also tested for comparison with Comparative Example H (the same composition as Comparative Example F, but the testing of Comparative Example F and Example 11 occurred in the more humid autumn of the year whereas the testing of Comparative Example H and Example 13 occurred in the less humid winter of the following year.)

At 265° C. and 100 sec$^{-1}$ Example 13 compared very favorably with Comparative Example H, as seen in Table 6. Because testing was done along an extended range of apparent shear rates, Table 7 shows those results for Example 13 and Comparative Example H, establishing the viscosity/shear rate curves (depicted in FIG. 5), with calculation of "essential matching" differential desired by the method of the present invention.

TABLE 7

Essential Matching

Apparent Viscosity (Pa · sec) at 265° C. and Various Shear Rates (s-1)

| Example | 10 | 16 | 25 | 40 | 63 | 100 | 159 | 251 | 398 | 631 | 1000 | 1200 |
|---|---|---|---|---|---|---|---|---|---|---|---|---|
| H (B40 Neat Nylon to be replaced) | 2530 | 2320 | 2110 | 1890 | 1670 | 1450 | 1230 | 1020 | 818 | 636 | 478 | 422 |
| 13 (8% I24TL Organoclay, 1.5% Raschig 9000 B70 NanoNylon) | 3940 | 3410 | 2880 | 2390 | 1940 | 1550 | 1220 | 947 | 725 | 549 | 411 | 366 |
| Differential From Target (Between 100 and 250 operable blown film co-extrusion -- "Essential Match") | 56% | 47% | 36% | 26% | 16% | 7% | −1% | −7% | −11% | −14% | −14% | −13% |

It is easily seen that use of the reaction factors in the study of Examples 1-12 resulted in a candidate of Example 13 that has an essential match of apparent viscosity (+/−10%) with B40 neat nylon at a temperature of 265° C. within a blown film co-extrusion shear rate range of 100-250 sec$^{-1}$, proving that one can "drop-in" an 8 wt. % nanonylon as a replacement for a blown film grade neat nylon.

Without undue experimentation, one of ordinary skill in the art can use the reaction factors to essentially match melt viscosities of other thermoplastic polymers to be replaced, within ranges of commercially operable shear rates and melt temperatures.

The invention is not limited to the above embodiments. The claims follow.

What is claimed is:

1. A multi-layer blown film article comprising a coextruded layer of chain-extended nanonylon, wherein the chain-extended nanonylon comprises a concentration of organoclay of greater than about 3 percent by weight and less than about 8 percent by weight of the chain-extended nanonylon, wherein the chain-extended nanonylon is the reaction product of an in-situ polymerized nanonylon and a chain extending agent selected from the group consisting of carbodiimides, carbodiimide hydrochlorides, multi-functional epoxies, carbonylbiscaprolactames, multi-functional acrylic oligomers, and combinations thereof and, wherein the weight average molecular weight of the in situ polymerized nanonylon has been increased from about 50,000 to 80,000 to from about 85,000 to about 110,000.

2. The article of claim 1, wherein the in-situ polymerized nanonylon comprises polycaprolactam (nylon 6), poly(hexamethylene adipamide) (nylon 6,6), poly(hexamethylene sebacamide) (nylon 6, 10), poly(11aminondecanoic acid) (nylon 11), poly(12-aminododecanoic acid) (nylon 12) and combinations thereof.

3. The article of claim 1, wherein the nanonylon further comprises an optional additive selected from the group consisting of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

4. The article of claim 1, wherein the nanonylon further comprises another polymer selected from the group consisting of polyolefins, polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

5. The article of claim 1, wherein the nanonylon is end-capped with an endcapping agent selected from the group consisting of acetic anhydride, phthalic anhydride, hexamethyl disilazane, acetic acid, and cyclohexylamine.

6. The article of claim 1, wherein the chain-extended nanonylon comprises in-situ polymerized nanonylon present in an amount ranging from about 10 to about 99.5 weight percent and the chain extending agent present in an amount ranging from about 0.5 to about 20 weight percent.

7. The article of claim 1, wherein the multi-layer blown film article further comprises a layer of polyethylene or a layer of polyethylene blend.

8. The article of claim 7, wherein the multi-layer blown film article further comprises a tie layer.

9. The article of claim 1, wherein the chain-extended nanonylon has a viscosity/shear rate curve in a commercially operable region of shear rate that essentially matches a viscosity/shear rate curve of a layer of a nylon or a layer of an ethylene vinyl alcohol to be replaced by the chain-extended nanonylon layer.

* * * * *